J. A. POSEY.
PNEUMATIC TIRE AND ARMOR THEREFOR.
APPLICATION FILED SEPT. 10, 1912.
1,059,207.
Patented Apr. 15, 1913.
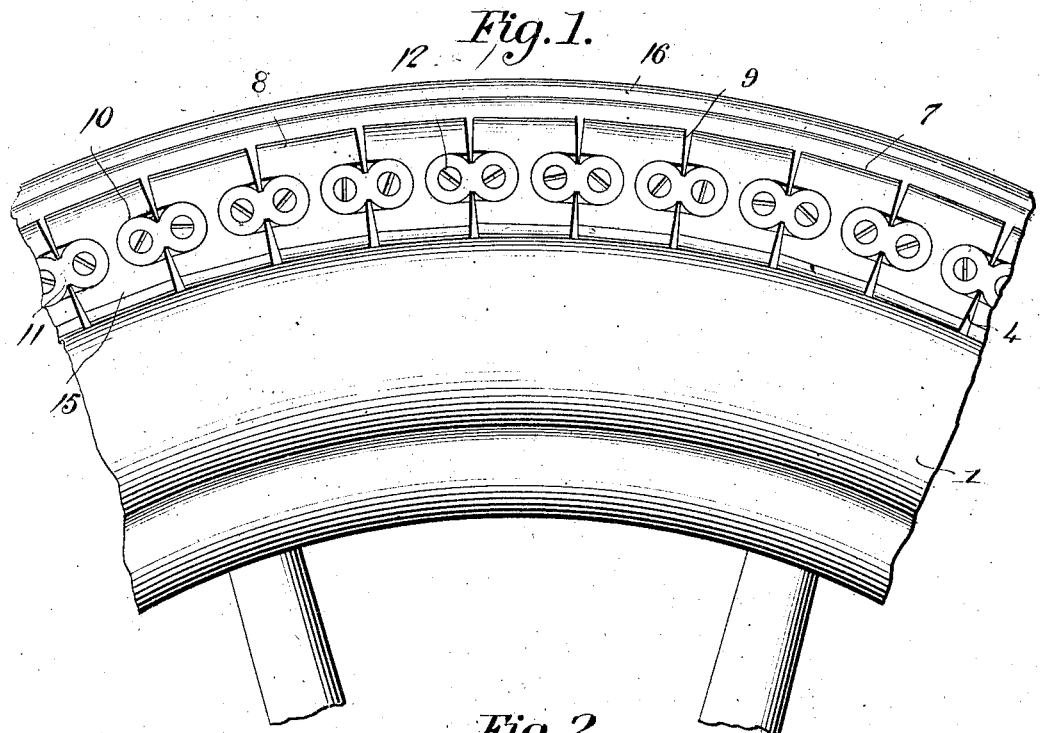
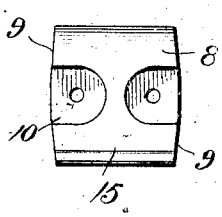
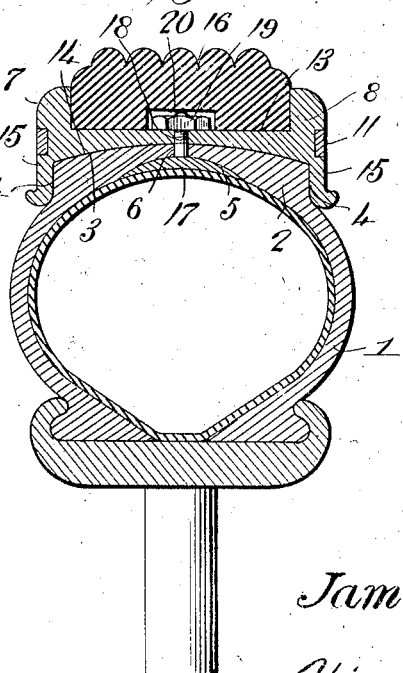
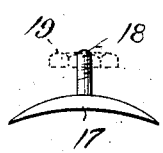
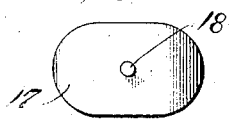
Inventor
James A. Posey,
By Victor J. Evans
Attorney
Witnesses
Carroll Bailey
F. W. Ackman Jr.

UNITED STATES PATENT OFFICE.

JAMES A. POSEY, OF WAXAHACHIE, TEXAS, ASSIGNOR OF ONE-HALF TO JOHN E. DUNAWAY, OF WAXAHACHIE, TEXAS.

PNEUMATIC TIRE AND ARMOR THEREFOR.

1,059,207.　　　　Specification of Letters Patent.　　Patented Apr. 15, 1913.

Application filed September 10, 1912. Serial No. 719,627.

*To all whom it may concern:*

Be it known that I, JAMES A. POSEY, a citizen of the United States, residing at Waxahachie, in the county of Ellis and State of Texas, have invented new and useful Improvements in Pneumatic Tires and Armors Therefor, of which the following is a specification.

This invention relates to pneumatic tires and armors therefor, the object of the invention being to provide a construction of tire and armor which permits of the firm retention of the armor in position and protection of the tire against possibility of puncture of the tread thereof, the ready and convenient placing of the armor in position and renewal of its tread portion when occasion requires, and a free and unrestricted movement of the armor so as to allow the tire to have ample resiliency.

The invention consists of the features of construction, combination and arrangement of parts hereinafter fully described and claimed, reference being had to the accompanying drawings, in which:—

Figure 1 is a side elevation of a portion of a pneumatic tire and armor constructed in accordance with my invention. Fig. 2 is a vertical transverse section of the same. Fig. 3 is a side view of one of the sections of the flexible armor rim. Fig. 4 is a similar view of one of the links. Fig. 5 is a side view of one of the clamping plates. Fig. 6 is a top plan view thereof.

Referring to the drawing, 1 designates a pneumatic tire of any suitable type, and which in accordance with my invention is provided with a thickened offset tread portion 2 having a transversely convexed or rounded upper face 3 and substantially straight and parallel side edges or abutment shoulders 4. The inner face of the tread surface of the tire is formed at suitable intervals with concave seats or recesses 5 and bolt holes 6 communicating therewith.

Surrounding the tread portion of the tire is an armor consisting of a flexible rim 7. This rim consists of a ring or band composed of a series of sections 8, which sections or segments have rounded contact surfaces 9 permitting them to have free relative movement under the contraction and expansion of the tire. The sides of the rim sections or segments are formed with recesses 10 receiving the enlarged approximately circular end portions of links 11 which fit freely therein and are pivotally secured to the sections by countersunk screws 12, whereby all the sections are pivotally coupled together to form a freely movable link band.

The sections of the band are formed in their upper faces with channels 13 and in their lower faces with channels 14, which latter receive and embrace the thickened tread and provide abutment flanges 15 engaging the abutment surfaces 4 of the tread, thus holding the guard in position against lateral strain and possibility of displacement. The channels 13 of the rim sections are in accurate alinement and receive a tread or wear surface 16 of rubber or other suitable elastic material, and which may be provided with a corrugated or roughened periphery for contact with the ground. This tread or wear surface 16 may be removed when worn and a new one substituted therefor without the necessity of detaching the rim from the tire.

The flexible rim is secured to the tire at suitable intervals by fastening devices each comprising a segmentally curved clamping plate 17 having a screw stem or bolt 18 projecting therefrom and receiving a clamping nut 19. The plates 17 fit within the recesses 5, and the bolts 18 project through the openings 6 in the tread 2 and receive the nuts 19, which bear upon the inner wall of the channels of the rim sections and thus clamp the rim in position against possibility of creeping or shifting movement on the tire or of radial outward displacement therefrom. The nuts and projecting ends of the bolts 18 fit within recesses 20 formed in the inner surface of the tread 16.

From the foregoing description, taken in connection with the drawings, it will be seen that a construction of rim is provided which is freely flexible with the tread portion of the tire, and that the construction of the latter permits of the firm retention of the flexible rim section in position, the tread surface of the tire thus being guarded against penetration, while permitted to move freely to give the desired cushioning resiliency. Also it will be seen that the construction described permits of the ready substitution of new treads 16 for old ones when the tread in use becomes worn from service.

I claim:—

A tire having an offset or thickened tread portion provided with a central concavity in the under side thereof, a flexible rim band surrounding the tire and channeled upon its inner and outer faces, the said channeled inner face of the rim band receiving and embracing said thickened tread portion, said rim band consisting of a series of sections having rounded contact portions and partially circular recesses in the sides thereof and links having partially circular end portions seated and pivotally mounted in said recesses, a resilient tread seated in the outer channel of the rim band, concavo-convex clamping plates bearing against the inner surface of the tread of the tire and seated in said concavity and having bolts projecting therefrom outwardly through the tire and rim, and nuts engaging said bolts and drawing said plates in clamping position.

In testimony whereof I affix my signature in presence of two witnesses.

JAMES A. POSEY.

Witnesses:
J. R. HOOD,
E. L. GIBSON.